(12) United States Patent
Gozdawa

(10) Patent No.: US 6,471,404 B1
(45) Date of Patent: Oct. 29, 2002

(54) BEARING WITH COOPERATING INNER AND OUTER SHELLS

(75) Inventor: Richard Julius Gozdawa, Hillingdon (GB)

(73) Assignee: Corac Group PLC (GB)

( * ) Notice: Subject to any disclaimer, the term of this patent is extended or adjusted under 35 U.S.C. 154(b) by 0 days.

(21) Appl. No.: 09/763,227

(22) PCT Filed: Aug. 19, 1999

(86) PCT No.: PCT/GB99/02753

§ 371 (c)(1),
(2), (4) Date: Mar. 26, 2001

(87) PCT Pub. No.: WO00/11362

PCT Pub. Date: Mar. 2, 2000

(30) Foreign Application Priority Data

Aug. 19, 1998 (GB) .............................. 9818097

(51) Int. Cl.[7] .............................. F16C 32/06
(52) U.S. Cl. .......................... 384/100; 384/12
(58) Field of Search ................. 384/12, 107, 99, 384/114, 100, 121, 398

(56) References Cited

U.S. PATENT DOCUMENTS

| | | | | |
|---|---|---|---|---|
| 3,110,525 A | * | 11/1963 | Sternlicht | 384/112 |
| 3,625,576 A | | 12/1971 | Miller et al. | |
| 3,669,514 A | * | 6/1972 | Wada et al. | 384/112 |
| 3,754,800 A | | 8/1973 | Johansson | |
| 4,153,993 A | * | 5/1979 | Kataoka et al. | 310/90.5 |
| 4,184,720 A | * | 1/1980 | Zacherl | 384/109 |
| 4,726,692 A | * | 2/1988 | Jansing et al. | 384/100 |
| 5,172,981 A | * | 12/1992 | Williams et al. | 384/108 |
| 5,634,326 A | * | 6/1997 | Wanger | 384/107 |
| 5,642,943 A | * | 7/1997 | Szeremeta | 384/100 |
| 5,645,345 A | * | 7/1997 | O'Neill et al. | 366/186 |
| 5,828,148 A | * | 10/1998 | Niggemann et al. | 310/86 |
| 6,019,515 A | * | 2/2000 | Fujii et al. | 384/107 |
| 6,238,475 B1 | * | 5/2001 | Gargulak et al. | 106/725 |

FOREIGN PATENT DOCUMENTS

| | | |
|---|---|---|
| EP | 0 282 297 A1 | 9/1988 |
| GB | 1129853 | 10/1968 |
| GB | 1213514 | 11/1970 |

OTHER PUBLICATIONS

International Search Report dated Oct. 1999 (3 pages).

* cited by examiner

*Primary Examiner*—Douglas C. Butler
*Assistant Examiner*—Ben Pezzlo
(74) *Attorney, Agent, or Firm*—Harness, Dickey & Pierce, P.L.C.

(57) ABSTRACT

A bearing assembly (2) comprises an outer shell (3) providing a pair of coaxial annular surfaces (4a, 5a) spaced apart and facing inwardly towards each other, and an inner shell (7) within the outer shell, the inner shell providing a pair of coaxial annular surfaces (8a, 9a), each of which faces outwardly towards one of the inwardly-facing annular surfaces of the outer shell and is arranged substantially coaxially with, and adjacent to, its associated inwardly-facing annular surface. The inner shell (7) is capable of movement relative to the outer shell (3) in an axial direction and by inclination to the outer shell. Each of the said inwardly-facing annular surfaces (4a, 5a) and/or its associated outwardly-facing annular surface (8a, 9a) has one or more channels (13, 14) arranged to extend around the surface. The bearing assembly (2) also comprises means (17–21) for supplying a fluid from a high pressure source to each of the said channels (13, 14) through flow resistance means (15, 16).

17 Claims, 4 Drawing Sheets

BEARING WITH COOPERATING INNER AND OUTER SHELLS

The invention relates to bearing assemblies.

In designing a rotor system comprising a rotary shaft held in bearings mounted on a frame, one consideration is for the frame to be able to support the bearings in correct alignment with the shaft upon its rotation at operational speeds. Errors in the construction or assembly of the rotor system, or thermal or other distortions of the frame, in operation, might cause the bearings to become dangerously misaligned with the shaft if the bearings were held rigidly with respect to the frame. It is known in the art to mount journal and thrust bearings in spherical shells so that they have some degree of freedom to align themselves with their shafts in the event of distortion of the frame, such bearings being referred to as "self-aligning bearings". In some circumstances, however, such spherical shells are not an attractive means of providing self-alignment.

The invention provides a bearing assembly for supporting or locating a rotary shaft in a frame, the assembly comprising an outer shell for fixing relative to the frame, the outer shell providing a pair of coaxial annular surfaces spaced apart and facing inwardly towards each other, and an inner shell within the outer shell, the inner shell providing a pair of coaxial annular surfaces, each of which faces outwardly towards one of the inwardly-facing annular surfaces of the outer shell and is arranged substantially coaxially with, and adjacent to, its associated inwardly-facing annular surface, the inner shell being able to move axially relative to and to tilt relative to the outer shell and to move axially relative to and to tilt relative to the shaft, and each of said inwardly-facing annular surfaces and/or its associated outwardly-facing annular surface having one or more channels arranged to extend around the surface, the bearing assembly also comprising means for supplying a fluid from a high pressure source to each of the said channels through flow resistance means.

With such a bearing assembly, the inner shell may be arranged as a journal bearing or as a thrust bearing for a rotary shaft.

In operation, the outer shell of the bearing assembly is fixed relative to a frame provided to support the rotary shaft. The inner shell holds the rotary shaft in its journal or thrust bearing. Fluid from the high pressure source is introduced through the flow resistance means, which is preferably one or more entry passages of restricted cross-sectional area for each channel, into the channels of the annular surfaces. The fluid flows around the channels and leaves the channels to flow radially inwards and outwards through gaps between the associated inwardly- and outwardly-facing annular surfaces of the shells, from where it escapes to the surroundings outside the outer shell at ambient pressure. The channels are generally of such radial width and depth, and the gaps between each inwardly-facing annular surface and its associated outwardly-facing annular surface are sufficiently narrow, that the resistance to the flow of fluid around the channels is small compared to the resistance to flow through the gaps between the annular surfaces of the inner and outer shells. Consequently, the pressure exerted by the fluid around each channel is effectively constant and is determined by the width of the associated gap, increasing as the width of the gap decreases, and decreasing as the width of the associated gap increases.

Accordingly, movement of the inner shell in one direction along the axis relative to the outer shell will cause the pressure exerted by the fluid in the channel or channels to increase on the side of the inner shell on which its. spacing with the outer shell has decreased and to decrease in the channel or channels on the other side of the inner shell where the spacing with the outer shell has increased. The pressure difference across the inner shell creates a restoring force on it urging it back to an equilibrium position, for example, a central position within the outer shell. In such an arrangement, the restoring force exerted on the inner shell can provide substantial resistance to displacement of the inner shell in an axial direction relative to the outer shell.

The channel or channels in each of the said inwardly-facing annular surfaces and/or its associated outwardly-facing annular surface advantageously extend substantially entirely around the surface, and preferably extend substantially concentrically around the surface. Advantageously, each of the said inwardly-facing annular surfaces and/or its associated outwardly-facing annular surface has a continuous channel. With such an arrangement, the pressure distribution around each of the said annular surfaces at a given radius is substantially uniform, in operation. The mean radius of such a channel is preferably substantially equal to the square root of the product of the inner and outer radii of the annular surface in which it is located. The channel in each surface need not, however, be a continuous channel, and there may be two or more arcuate channels of equal mean radius, or even two or more channels of different mean radii in each of the said annular surfaces, and the configuration of the channel or channels in one annular surface need not be the same as that of another, but the pressure distribution around each annular surface at a given radius is preferably substantially uniform, in operation.

When the bearing assembly is arranged to provide a journal bearing, the inner shell advantageously comprises a journal bearing through which the shaft, or journal, can extend, and an annular flange on the journal bearing, which provides the said outwardly-facing annular surfaces. Such an arrangement can, by exerting a substantial restoring force on the flange of the inner shell should it move in an axial direction from its predetermined position relative to the outer shell, provide positive location of the journal bearing relative to the apparatus frame while allowing inclination of the flange of the inner shell relative to the outer shell and, hence, self-alignment of the journal bearing with the rotary shaft. The extent to which the flange of the inner shell can become inclined to the outer shell, and hence the limits of the self-aligning capability of the journal bearing, is determined by the dimensions of the inner and outer shells and the sizes of the gaps between the annular surfaces.

In an arrangement in which continuous channels are provided in the annular surfaces, although it is possible to arrange for the bearing assembly to provide a substantial restoring force against relative displacement of the inner shell in an axial direction as discussed above, if associated annular surfaces become slightly inclined to each other the pressure will still be substantially uniform at a given radius around each surface and no significant restoring moment against that inclination will be created. Thus, in the event of inclination of the inner shell with respect to the outer shell, as, for example, on self-alignment of a journal bearing as referred to above, the inner shell will remain inclined to the outer shell. Such an arrangement is suitable for journal bearings having self-generating capabilities, that is to say, the capability, on rotation of the shaft at a rate of rotation above a threshold rate, of generating a continuous film of lubricant fluid between the bearing and the shaft to prevent solid to solid contact. Examples of suitable self-generating journal bearings are a simple self-generating journal bearing of circular bore, a tilting-pad journal bearing, a journal bearing with fixed lands, or a journal bearing as described and claimed in our co-pending patent application No. (case II) filed on the same date as this patent application.

When the bearing assembly is arranged to provide a thrust bearing, the inner shell advantageously provides inwardly-facing thrust and surge bearing surfaces for acting on each side of a thrust collar of a rotary shaft. With such an arrangement, thrust exerted by the thrust collar on the thrust bearing surface of the inner shell such as to cause axial displacement of the inner shell is resisted by the restoring force created when the inner shell moves from its equilibrium position within the outer shell. Advantageously, the inner shell provides two inwardly-facing co-axial annular surfaces, each of the said inwardly-facing annular surfaces of the inner shell having one or more channels arranged to extend, preferably, substantially concentrically, around the surface, and there is also provided means for supplying a fluid from a high pressure source to each of the said channels through flow resistance means, for example, one or more entry passages of restricted cross-sectional area for each channel. The said inwardly-facing annular surfaces of the inner shell form the thrust and surge bearing surfaces, respectively, of the thrust bearing. The outwardly-facing and inwardly-facing annular surfaces of the inner shell are advantageously co-axial, and are preferably provided by annular members spaced apart from each other in an axial direction. With such an arrangement, in operation, the annular members of the inner shell are located on each side of an annular thrust collar of the rotary shaft, the inwardly-facing surfaces of the inner shell being arranged adjacent to, but separated from, the annular surfaces of the thrust collar to allow relative movement between the thrust collar and the inner shell in an axial direction and also to allow inclination of the inner shell relative to the thrust collar.

If the said inwardly-facing annular surfaces of the inner shell are each provided with a continuous channel, then, in addition to the restoring force acting on the inner shell arising as a result of axial displacement of the inner shell relative to the outer shell as explained above, an additional restoring force is created between the inner shell and the thrust collar in the event of relative axial displacement that acts to keep the inner shell at an equilibrium position relative to the thrust collar. Hence it is possible to arrange for the bearing assembly to provide a substantial restoring force against thrust transmitted by the thrust collar. If, however, each of the said inwardly-facing annular surfaces of the inner shell is formed with two or more arcuate channels of substantially equal mean radius instead of a continuous channel, and each arcuate channel is supplied with fluid from a high pressure source independently through its own entry passage then, although the pressure exerted by the fluid within each channel will be substantially constant, and the pressure exerted in the channels of each annular surface can be substantially equal when that annular surface is in a parallel plane to that of the adjacent annular surface of the thrust collar, the pressures exerted in the channels of the same annular surface will change relative to each other as that annular surface is inclined relative to the annular surface of the thrust collar at least in one sense. Thus, it is possible to arrange for a substantial restoring moment to arise between the inner shell and the thrust collar in addition to the restoring force acting between the two. In order to produce a restoring moment about two axes perpendicular to each other and to the axis of the shaft, as is advantageous, three or more arcuate channels, preferably of substantially equal mean radius, and desirably of substantially equal length, should be provided on each of the inwardly-facing annular surfaces of the inner shell. With such an arrangement, the inner shell provides a thrust bearing able to align itself with the thrust collar of a rotary shaft in the event of relative inclination of the outer shell to the thrust collar caused, for example, by distortion of the frame. With an arrangement in which there is substantially no restoring moment between the outer shell and the inner shell, inclination of those surfaces to each other is maintained, but the restoring force between the outer shell and the inner shell remains the same upon relative movement in an axial direction between the inner and outer shells. Such an arrangement allows relative inclination to occur between stationary surfaces (that is to say, surfaces that do not rotate with the shaft) of the inner and outer shells whilst tending to maintain alignment between the inner shell and the thrust collar, which are in relative movement, reducing the risk of solid to solid contact between stationary and rotating surfaces.

Such an arrangement of bearing assembly is suitable for thrust bearings of a self-generating kind such as tilting pad thrust bearings, or thrust bearings that combine self-generation with aerostatic or hydrostatic separation, for example, by providing annular surfaces of the thrust collar with spiral channels handed to diminish by their pumping action the radial flow of fluid in the gaps between the thrust collar and the inner shell.

The fluid introduced into the channels from the high pressure source may be air, and is advantageously air in some applications, but the fluid may be another gas, or it may also be a liquid, for example, water.

In practice, the extent to which the inner shell can move axially within the outer shell, or become inclined to the outer shell, is relatively small, the gaps between adjacent annular surfaces being relatively fine.

The configuration and dimensions of the inner and outer shells including the channels in the annular surfaces, the width of the gaps between the annular surfaces, and the size of the flow resistances is a matter of detailed design in any particular case but can readily be determined in practice for any particular application.

Three forms of bearing assembly constructed in accordance with the invention will now be described, byway of example, with reference to the accompanying drawings, in which.

Figure 1:
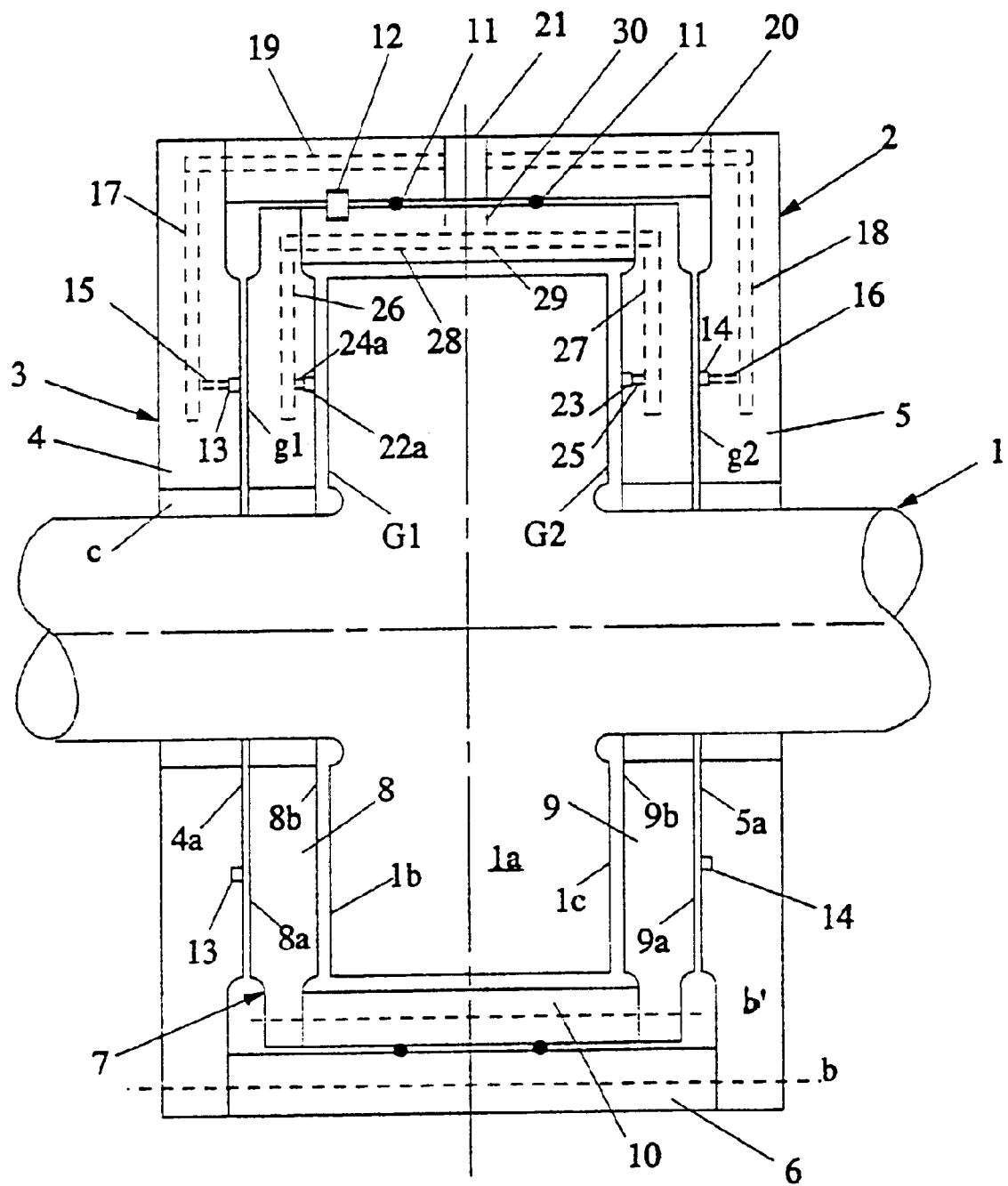
FIG. 1 is a diagrammatic vertical cross-section through the first form of bearing assembly, which provides a thrust bearing for a rotary shaft, and also shows the shaft and its thrust collar.
Figure 2:
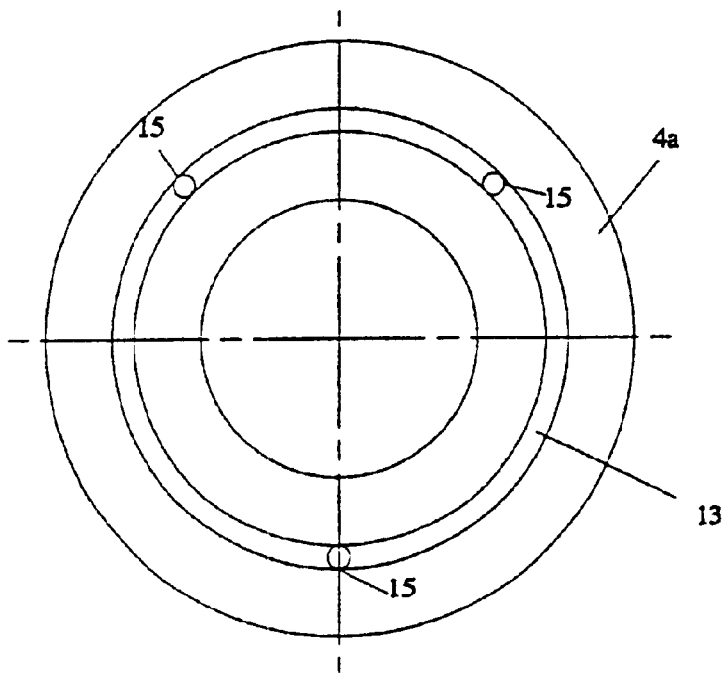
FIG. 2 is a view of a part of the bearing assembly of FIG. 1.
Figure 3:
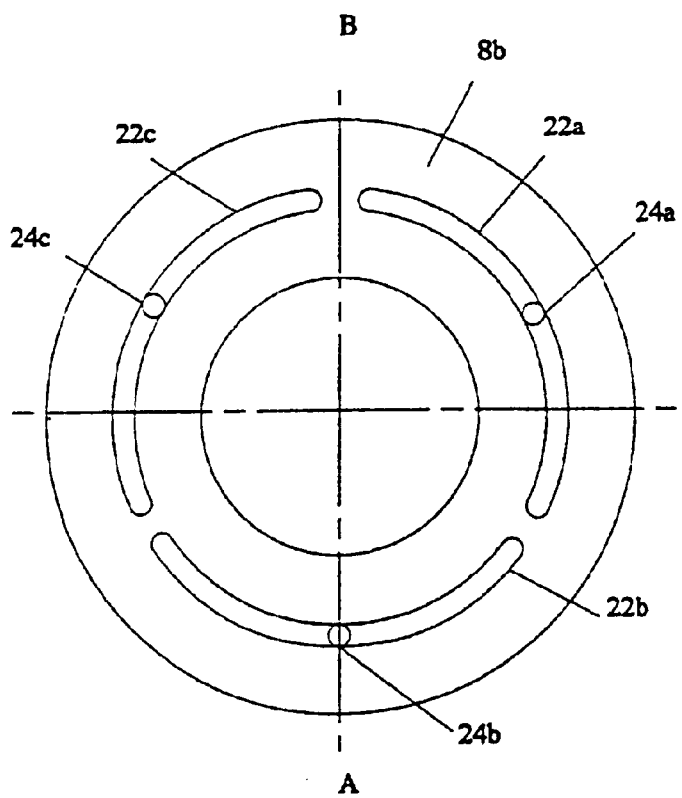
FIG. 3 is a view of a further part of the bearing assembly of FIG. 1.

Referring to the accompanying drawings, and initially to FIGS. 1 to 3, a rotary shaft, indicated generally by the reference numeral 1, has an integral annular thrust collar 1a. The shaft 1 extends through a bearing assembly, indicated generally by the reference numeral 2, which provides a thrust bearing for the shaft, and is arranged to act on the thrust collar 1a to restrain displacement of the shaft in an axial direction.

The bearing assembly 2 comprises an outer shell, indicated generally by the reference numeral 3, composed of a pair of co-axial annular members 4 and 5, respectively, secured to each end of a cylindrical member 6 by means of bolts, one of which is indicated schematically by dotted line b. The cylindrical member 6 acts as a spacer for the annular members 4 and 5 to hold them at a fixed distance from each other. The outer shell 3 is fixed by means (not shown), for example, a flange and bolts, to a supporting frame (not shown) for the shaft 1. Within the outer shell 3 is located an inner shell, indicated generally by the reference numeral 7. The inner shell 7 comprises a pair of annular members 8 and 9, respectively, spaced apart at a fixed distance from each other by a cylindrical member 10 and secured to the cylindrical member by bolts one of which is indicated schematically by dotted line b'.

The annular members 4 and 5 of the outer shell 3 each have an inwardly-facing annular surface 4a, 5a, respectively, set proud to facilitate its precise finishing, for example, by lapping. The annular members 8 and 9 of the inner shell 7 have outwardly-facing annular surfaces 8a and 9a, respectively, also standing proud to facilitate precise finishing. The cylindrical members 6 and 10 are of such dimensions that when the inner shell 7 is located coaxially and centrally within the outer shell 3 as shown in FIG. 1, the outwardly-facing surface 8a of the inner shell faces the inwardly-facing surface 4a of the outer shell 3 with a small gap $g_1$, or clearance, of uniform width between them, and the outwardly-facing surface 9a faces the inwardly-facing surface 5a with a small gap $g_2$ between them equal in width to the gap $g_1$ between the surfaces 8a and 4a.

The inner shell 7 is located substantially coaxially within the outer shell 3 by means of O-ring seals 11, and relative rotation between the inner shell and the outer shell is prevented by a loosely fitting key 12. The O-rings 11, by substantially elastic shear deflections, and the key 12, because of its loose fitting, are arranged to allow a small amount of axial play and/or tilting between the inner shell 7 and the outer shell 3 within the limits imposed by the widths of the gaps $g_1$ and $g_2$ between the inner and outer shells.

The shaft 1 extends through the annular members 4 and 5 of the outer shell 3 and the annular members 8 and 9 of the inner shell 7, the diameter of the shaft being smaller than the internal diameter of the annular members so that there is clearance c around the shaft as it passes through the annular members. The thrust collar 1a of the shaft 1 projects between the annular members 8 and 9 of the inner shell 7. The annular members 8 and 9 have inwardly-facing annular surfaces 8b and 9b, respectively, which surfaces stand proud of the members. Those inwardly-facing surfaces 8b and 9b are substantially coaxial with, and separated by small gaps $G_1$ and $G_2$ respectively, from, annular surfaces 1b and 1c, respectively, of the collar 1a, which also stand proud of the collar. In addition to the axial play and freedom to tilt between the inner shell 7 and the outer shell 3, there is also axial play and freedom to tilt between the inner shell and the collar 1a of the rotary shaft 1, the amount of which is determined by the width of the gaps $g_1$, $g_2$ and $G_1$, $G_2$. As can be seen in FIG. 1, there is also a clearance between the periphery of the collar 1a and the cylindrical member 10.

Each of the inwardly-facing annular surfaces 4a and 5a of the outer shell 3 is formed with a concentric continuous circular channel 13 and 14, respectively, the annular surface 4a being shown in FIG. 2, and the annular surface 5a being similarly formed. Each of the channels 13 and 14 can be supplied with air from a high pressure receiver (not shown) through two sets of three entry passages 15 and 16, respectively, the diameter of each of the entry passages 15, 16 being substantially smaller than the width of the channels 13, 14. The entry passages 15, 16 are in communication with the high pressure receiver through bores 17 and 18, respectively, formed in the annular members 4 and 5, bores 19 and 20, respectively, extending through the cylindrical member 6, and a plurality of entry ports 21, only one of which is shown in FIG. 1, provided in the outer shell 3 to which the high pressure receiver is connected, in operation The entry passages 15 and 16, respectively, provide substantial resistance to the flow of air from the receiver, the entry passages being of restricted cross-sectional area compared to the cross-sectional area of the bores through which they are supplied with air from the receiver.

Each of the inwardly-facing annular surfaces 8b and 9b of the inner shell 7 is formed with a set of three arcuate channels 22 and 23, respectively. The surface 8b and the set of channels 22 is shown in FIG. 3 and will be described in more detail below, but it will be understood that the surface 9b and the channels 23 are similarly arranged. As can be seen in FIG. 3, each of channels 22a, 22b and 22c, respectively, of the set 22 are of equal length and of equal mean radius and extend substantially entirely around the surface 8b with only small dividing portions between them. Each of the channels 22a, 22b, 22c is supplied with air from the high pressure receiver through its own entry passage 24a, 24b and 24c, respectively, the diameter of each of the entry passages being substantially smaller than the width of the channel it supplies. Each of the entry passages 24a, 24b and 24c together with entry passages 25 for the channels 23 of the surface 9b are in communication with the high pressure receiver through bores 26 and 27, respectively, formed in the annular members 8 and 9, bores 28 and 29, respectively, formed in the cylindrical member 10 and inlets 30 (only one of which is shown in FIG. 1) also formed in the cylindrical member 10. Each inlet 30 is, in turn, in communication with one of the inlets 21 which are connected to the high pressure receiver, in operation. The O-rings 11 serve to prevent the escape of high pressure air from the region between the inlets 21 and the inlets 30. The entry passages 24a, 24b and 24c each provide substantial resistance to flow, being of restricted cross-sectional area compared to the cross-sectional area of the bores through which they are supplied with air.

In operation, the high pressure receiver, which is, for example, at a pressure of 8 bara, is connected to the inlets 21 of the bearing assembly 2 and from there pressurised air is supplied to the channels 13 and 14 in the annular members 4 and 5 of the outer shell 3 through the bores 19, 17 and 20, 18, and the entry passages 15 and 16, respectively. Similarly pressurised air is also supplied to the channels 22 and 23 in the annular members 8 and 9 of the inner shell 7 through the inlets 30, the bores 28, 26 and 29, 27, and the entry passages 24 and 25, respectively. The inlets 21 and 30, and the bores 18 to 20 and 26 to 29 are of such dimensions as to provide little resistance to the flow of air from the high pressure receiver, so that the pressure immediately upstream of the entry passages 15, 16 and 24, 25 is substantially that of the high pressure receiver. Because the restricted cross-sectional area of the entry passages 15, 16 and 22, 23 provide substantial resistance to flow, however, there is a substantial pressure drop across each of them, and the air entering the channels 13, 14 and 22, 23 is at significantly lower pressure than that of the high pressure receiver. The air entering the channels 13, 14 and 22, 23 flows around the channels and radially inwards and outwards through the gaps $g_1$, $g_2$ between the inwardly-facing annular surfaces 4a, 5a of the outer shell 3 and the outwardly-facing surfaces 8a, 8b of the inner shell 7, and also through the gaps $G_1$, $G_2$ between the inwardly-facing surfaces 8b, 9b of the inner shell and the annular surfaces 1b, 1c of the thrust collar 1a of the shaft 1. From the gaps $g_1$, $g_2$ and $G_1$, $G_2$ between the annular surfaces, the air escapes to the surroundings, for example, through the clearance c around the shaft 1, at ambient pressure. The dimensions of the channels 13, 14 and 22, 23 are relatively large compared to the diameter of those of the entry passages 15, 16 and 24, 25, and the channels themselves offer little resistance to the flow of air around them. Thus, the pressure exerted by the air around each of the channels 13, 14 and 22, 23 is substantially constant and determined by the width of the gaps $g_1$, $g_2$ and $G_2$, $G_2$, respectively, between the associated annular surfaces through which the air flows from each channel to the exterior. Because those gaps are narrow, the air in the channels 13, 14 and 22, 23 is in any case maintained at pressures substantially higher than ambient pressure, but the pressure exerted by the air in each channel will increase as the width of its associated gap decreases, and decrease as the width of that gap increases.

In the event of relative movement between the inner shell 7 and the outer shell 3 in an axial direction, for example, movement that results in the annular surface 8a moving towards the annular surface 4a, the pressure exerted by the air in the continuous channel 13 increases, and the pressure in the channel 14 decreases correspondingly. The pressure difference across the inner shell 7 creates a restoring force, which, with the outer shell 3 being fixed to the frame, urges the inner shell back to its equilibrium position, in this case a central position within the outer shell 3. That restoring force provides substantial resistance to axial displacement of the inner shell 7 in an axial direction relative to the outer shell 3.

Figure 4:
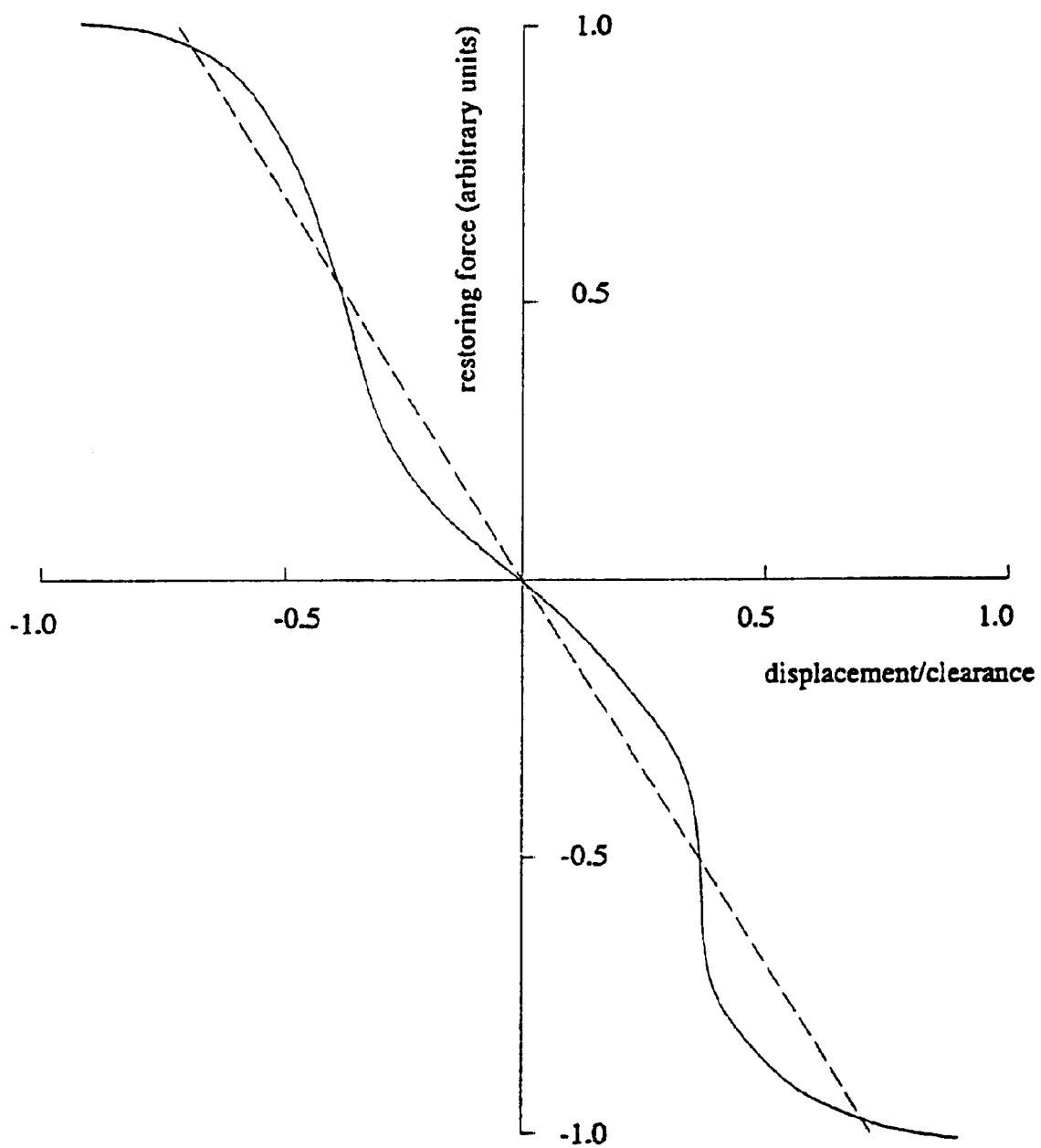
FIG. 4 is a graph showing restoring force exerted by the first form of the bearing assembly against axial displacement.

FIG. 4 shows a typical plot (represented by a solid line) of restoring force in arbitrary units acting on the inner shell 7 as a function of the ratio of axial displacement of the inner shell to the mean gap width separating adjacent annular surfaces. As can be seen from FIG. 4, the restoring force remains high up to axial displacements of up to 60% of the gap width. The departures of the line from proportionality come from the non-linearities of flow phenomena.

A similar restoring force is created upon relative axial movement between the inner shell 3 and the thrust collar 1a. The pressure exerted by the air within the channels 22 and 23 is determined by the width of the gaps $G_1$ and $G_2$, respectively, between the inner shell 7 and the thrust collar 1a. If, for example, the width of the gap $G_1$ decreases due to relative axial movement between the thrust collar 1a and the annular surface 8b, then the pressure will increase in the channels 22, whereas the pressure in the channels 23 will decrease as the width of the gap $G_2$ correspondingly increases. The restoring forces exerted as a result of axial movement of the inner shell 7 relative to the outer shell 3, and as a result of relative axial movement between the inner shell and the thrust collar 1a, act together to counter thrust exerted by the thrust collar 1a on the bearing assembly 2.

In the event of distortion of the supporting frame as the shaft 1 rotates, leading to angular displacement of the shaft 1 relative to the axis of the bearing assembly 2, the annular surfaces 1b and 1c of the thrust collar 1a become inclined to the vertical planes in which they are shown in FIG. 1. Thus, for example, the angular displacement of the shaft 1 may be such that the collar 1a rotates in an anti-clockwise sense when viewed in the same direction as FIG. 1. In such a case, the annular surface 1b of the collar 1a will become tilted relative to the annular surface 8b of the inner shell 7 and the clearance between those surfaces will decrease along a line between points A and B shown in FIG. 3 in the direction from A to B. As the annular surface 8b is provided with three separate arcuate channels 22a, 22b and 22c, each supplied with air through its own entry passage 24a, 24b and 24c, the pressure exerted by the air in each of the channels, although being substantially equal when the annular surfaces 8b and 1b are in parallel vertical planes, become unequal with such an inclination. The pressure exerted by the air in the channel 22b will decrease because of the increased clearance, and the pressure in the channels 22a and 22c will correspondingly increase. A moment is created which tends to restore the annular surface 1b and the annular surface 8b to parallel planes. A similar moment acting in the opposite sense is created on the other side of the collar 1a because of pressure differences between the air in the three channels 23 of the annular surface 9b. Under the action of the restoring moments, the inner shell 7 is urged into alignment with the thrust collar 1a so that it is co-axial with it and clearance is maintained between the inner shell (which does not rotate with the shaft 1) and the rotating shaft. At the same time, the axis of the inner shell 3 becomes inclined to that of the fixed outer shell 3. Because the channels 13, 14 in the annular faces 4a and 5a of the outer shell 3 are continuous, the pressure exerted by the air at a given radius between the inner shell 7 and the outer shell remains substantially constant and no significant restoring moment is created. The inner shell 7 therefore remains inclined to the outer shell 3, but in this case since neither of the inner and outer shells rotate with the shaft there is no risk of solid to solid contact between rotating and non-rotating surfaces.

As will be appreciated from the above explanation, the precise magnitudes of the two restoring forces depend at least in part upon the widths of the gaps $g_1$, $g_2$ and $G_1$, $G_2$, and the dimensions of the entry passages 15, 16 and 24, 25 and of the channels 13, 14 and 22, 23 in the annular surfaces. Within the limits of practicability, those dimensions can readily be settled by design in any particular application. An example of suitable dimensions is, however, as follows. The air in the high pressure receiver is at a pressure of 8 bara, and the air exhausts to atmosphere at 1 bara. The diameter of the entry passages is 1 mm. The annular surfaces of the outer shell, the inner shell and the thrust collar have an inner diameter of 60 mm and an outer diameter of 100 mm. Each of the inwardly-facing annular surfaces of the outer shell has formed in it at a mean radius of 77 mm a channel of 2 mm radial width and a depth of 3 mm. Each inwardly-facing annular surface of the inner shell has formed in it, at a mean radius of 77 mm, three arcuate channels of equal length, each being of 2 mm radial width and a depth of 3 mm. The total axial clearance (the sum of the widths of the gaps) between the inner and outer shells is 120 $mm^{-6}$, and the calculated secant stiffness of the restoring force is of the order of $10^7$ $Nm^{-1}$, at a displacement of the inner shell within the outer shell of one quarter of the total axial clearance between them. The secant stiffness for the inclination of the inner shell within the outer shell of 0.8 of the greatest inclination allowed by the clearance is of the order of $10^2$ Nm $rad^{-1}$. The total axial clearance (the sum of the widths of the gaps) between the inner shell and the thrust collar is 80 $m^{-6}$, and the calculated secant stiffness of the restoring force is of the order of $10^7$ $Nm^{-1}$ at a displacement of the thrust collar within the inner shell of one quarter of the total axial clearance between them. The secant stiffness for the inclination of the inner shell to the thrust collar of 0.8 of the greatest inclination allowed by the clearance is of the order of $10^3$ Nm rad$^{-1}$. That angular stiffness is an order of magnitude greater than the angular stiffness between the inner and outer shells, and therefore determines that the self-alignment of the thrust collar and the inner shell will be predominantly by way of inclination of the bearing surfaces of the thrust collar to the stationary co-operating inwardly-facing annular surfaces of the inner shell.

The provision of three arcuate channels 22 and 23 in each of the annular surfaces 8b and 9b allows a restoring force to be produced in the event of angular displacements of the shaft 1 about two perpendicular axes. The number of arcuate channels in each such annular surface need not, however, be limited to three, and four or more may be provided.

Figure 5:
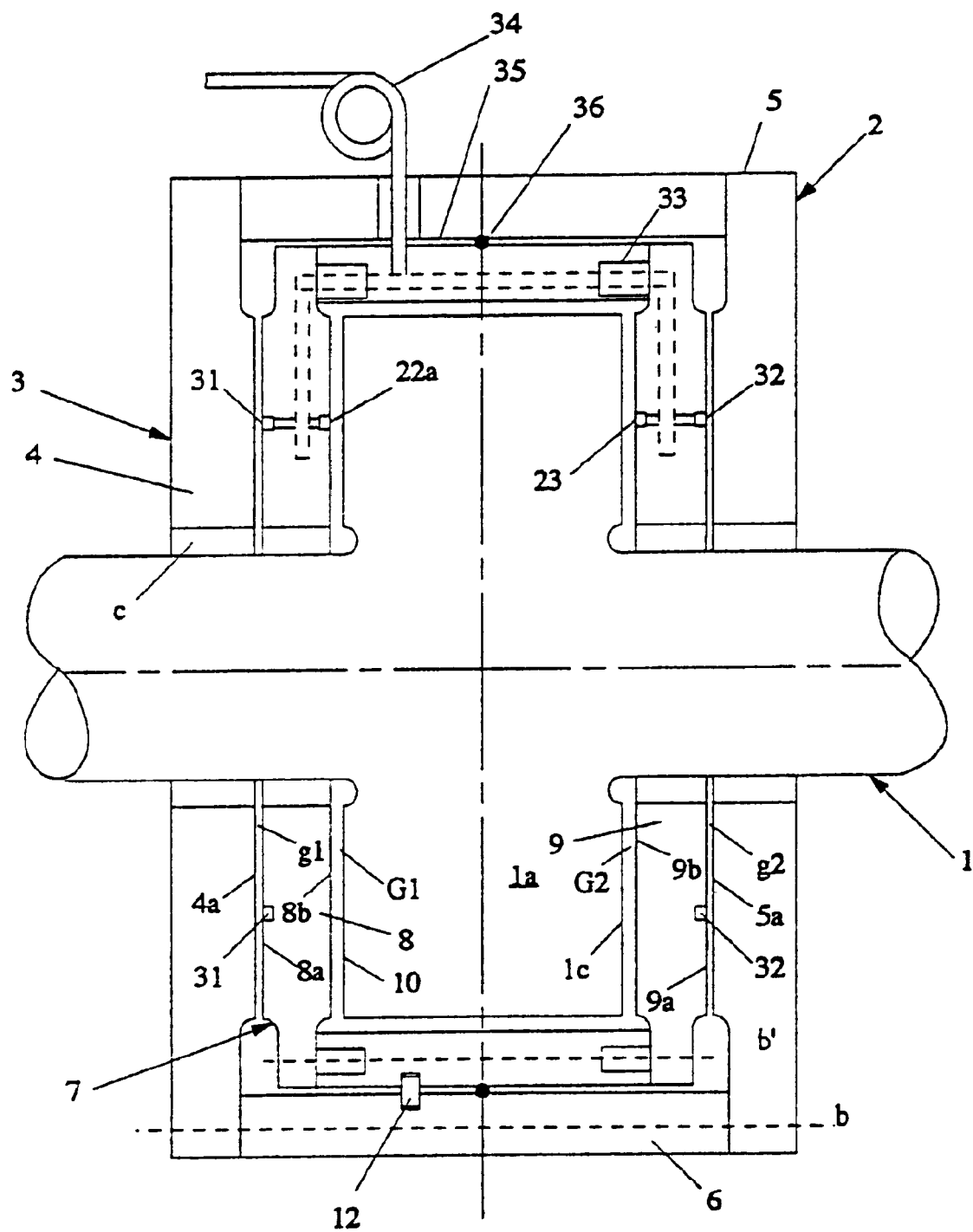
FIG. 5 is a diagrammatic vertical cross-section through the second form of bearing assembly, which provides a thrust bearing for a rotary shaft, and also shows the shaft and its thrust collar.

The second form of the bearing assembly shown in FIG. 5 is similar in many respects to the first form of the bearing assembly, and the same reference numerals have been used for the same features where appropriate.

The differences between the bearing assembly of FIG. 5 and the first form of assembly are that instead of providing continuous channels 13 and 14 in the inwardly-facing annular surfaces of the outer shell 3, continuous channels 31 and 32 are provided in the outwardly-facing annular surfaces 8a and 9a of the inner shell 7. The channels 31 and 32 can be supplied with pressurised air through galleries 33 machined in the cylindrical member 10, the galleries being in communication with the high pressure receiver through a flexible pipe 34 which passes through a clearance hole 35 in the cylindrical member 6. In addition, the inner shell 7 is located substantially co-axially within the outer shell 3 by means of a single centrally-placed O-ring 36 instead of the O-rings 11 of the first form of bearing assembly. The single O-ring 36 exerts less constraint than the spaced O-rings 11 upon the alignment of the inner shell 7 with the shaft 1 in the event of relative angular displacement of the shaft.

Although in the above description, reference has been made to air as the fluid introduced into the bearing assemblies 2 and 38 from the high pressure receiver, other gases or liquids, for example, water, may be used instead.

What is claimed is:

1. A bearing assembly for supporting or locating a rotary shaft in a frame, the assembly comprising an outer shell for fixing relative to the frame, the outer shell providing a pair of coaxial annular surfaces spaced apart and facing inwardly towards each other, and an inner shell arranged to provide a journal bearing or a thrust bearing for the rotary shaft, the inner shell being prevented from substantial rotation relative to the outer shell and being positioned within the outer shell and providing a pair of coaxial annular surfaces, each of which faces outwardly towards one of the inwardly-facing annular surfaces of the outer shell and is arranged substantially coaxially with, and adjacent to, its associated inwardly-facing annular surface, the inner shell being able to move axially relative to and to tilt relative to the outer shell and to move axially relative to and to tilt relative to the shaft, and each of said inwardly-facing annular surfaces and/or its associated outwardly-facing annular surface having one or more channels arranged to extend around the surface, the bearing assembly also comprising means for supplying a fluid from a high pressure source to each of the said channels through flow resistance means, said channels being so constructed and arranged that, in use, the pressure distribution around said annular surfaces at a given radius is substantially uniform.

2. A bearing assembly as claimed in claim 1, wherein the flow resistance means comprises one or more entry passages of restricted cross-sectional area for each channel.

3. A bearing assembly as claimed in claim 1, wherein the channel or channels in each of the said inwardly-facing annular surfaces and/or its associated outwardly-facing annular surface extend substantially entirely around the surface.

4. A bearing assembly as claimed in claim 1, wherein the channel or channels in each of the said inwardly-facing annular surfaces and/or its associated outwardly-facing annular surface extend substantially concentrically around the surface.

5. A bearing assembly as claimed in claim 1, wherein each of the said inwardly-facing annular surfaces and/or its associated outwardly-facing annular surface has a continuous channel.

6. A bearing as claimed in claim 5, wherein the mean radius of the channel is substantially equal to the square root of the product of the inner and outer radii of the annular surface in which it is located.

7. A bearing assembly as claimed in claim 1, wherein the inner shell also provides inwardly-facing thrust and surge bearing surfaces for acting on each side of a thrust collar of a rotary shaft.

8. A bearing assembly as claimed in claim 7, wherein the thrust and surge bearing surfaces of the inner shell are provided by two inwardly-facing co-axial annular surfaces, each of the said inwardly-facing annular surfaces of the inner shell having one or more channels arranged to extend around the surface, and there is also provided means for supplying a fluid from a high pressure source to the each of the said channels through flow resistance means.

9. A bearing assembly as claimed in claim 8, wherein the outwardly-facing and inwardly-facing annular surfaces of the inner shell are co-axial.

10. A bearing assembly as claimed in claim 9, wherein the outwardly-facing and inwardly-facing annular surfaces of the inner shell are provided by annular members spaced apart from each other in an axial direction.

11. A bearing assembly as claimed in claim 8, wherein three or more arcuate channels of substantially equal length and substantially equal mean radius are provided on each of the inwardly-facing annular surfaces of the inner shell.

12. A bearing assembly as claimed in claim 1, wherein the thrust bearing is a self-generating thrust bearing.

13. A bearing assembly as claimed in claim 1, wherein the means for supplying a fluid to each of the said channels is means for supplying air from a high pressure receiver.

14. A bearing assembly as claimed in claim 1, wherein each said channel has a base and a pair of side walls and divides the annular surface in which it is formed into a first annular surface portion radially inwardly of the channel and a second annular surface portion radially outwardly of the channel.

15. A bearing assembly as claimed in claim 1, wherein said prevention of substantial relative rotation between the inner and outer shells is provided by a key fitted between the inner and outer shells.

16. A rotor assembly including a rotary shaft, a frame and one or more bearing assemblies as claimed in claim 1 supporting or locating the rotary shaft in the frame.

17. A compressor comprising a bearing assembly as claimed in claim 1.

* * * * *

UNITED STATES PATENT AND TRADEMARK OFFICE
CERTIFICATE OF CORRECTION

PATENT NO. : 6,471,404 B1
DATED : October 29, 2002
INVENTOR(S) : Richard Julius Gozdawa It is certified that error appears in the above-identified patent and that said Letters Patent is hereby corrected as shown below:

<u>Title page,</u>
Item [57], ABSTRACT,
Line 3, "apart-and" should be -- apart and --.

<u>Column 2,</u>
Line 1, "its." should be -- its --.

<u>Column 4,</u>
Line 42, "byway" should be -- by way --.

<u>Column 6,</u>
Line 9, after "operation" insert -- . --.

<u>Column 7,</u>
Line 14, first occurrence, "$G_2$" should be -- $G_1$ --.

<u>Column 8,</u>
Line 53, "120 mm$^{-6}$" should be -- 120m$^{-6}$ --.

<u>Column 10,</u>
Line 15, after "bearing" insert -- assembly --.

Signed and Sealed this

Twelfth Day of August, 2003

JAMES E. ROGAN
*Director of the United States Patent and Trademark Office*